(12) United States Patent
Laughlin et al.

(10) Patent No.: US 11,535,245 B2
(45) Date of Patent: Dec. 27, 2022

(54) SYSTEMS AND METHODS FOR REDUCING A SEVERITY OF A COLLISION

(71) Applicant: The Boeing Company, Chicago, IL (US)

(72) Inventors: Brian Dale Laughlin, Wichita, KS (US); John William Glatfelter, Kennett Square, PA (US); Jeff Alan Heisserman, Clinton, WA (US)

(73) Assignee: THE BOEING COMPANY, Chicago, IL (US)

( * ) Notice: Subject to any disclaimer, the term of this patent is extended or adjusted under 35 U.S.C. 154(b) by 74 days.

(21) Appl. No.: 16/869,743

(22) Filed: May 8, 2020

(65) Prior Publication Data

US 2021/0347355 A1 Nov. 11, 2021

(51) Int. Cl.
*B60W 30/085* (2012.01)
*B60W 60/00* (2020.01)
*B60W 30/095* (2012.01)
*G06V 20/58* (2022.01)

(52) U.S. Cl.
CPC ...... *B60W 30/085* (2013.01); *B60W 30/0953* (2013.01); *B60W 30/0956* (2013.01); *B60W 60/0011* (2020.02); *B60W 60/0015* (2020.02); *G06V 20/58* (2022.01)

(58) Field of Classification Search
CPC .......... B60W 30/085; B60W 30/0953; B60W 60/0011; B60W 60/0015; B60W 30/0956; B60W 30/09; B60W 2420/42; B60W 2530/10; B60W 2554/404; B60W 2554/4042; G06K 9/00805; G06V 20/58
See application file for complete search history.

(56) References Cited

U.S. PATENT DOCUMENTS

| | | | |
|---|---|---|---|
| 8,831,870 B2 | 9/2014 | Whikehart et al. | |
| 9,108,582 B1 | 8/2015 | Kozloski et al. | |
| 9,174,598 B2* | 11/2015 | Harada | B60R 21/0134 |
| 9,701,307 B1* | 7/2017 | Newman | B60W 30/095 |
| 9,747,802 B2* | 8/2017 | Fisher | G06K 9/00362 |
| 2013/0261869 A1* | 10/2013 | Brenneis | B60R 21/00 701/23 |
| 2015/0239413 A1* | 8/2015 | Kozloski | H04L 67/12 701/1 |
| 2017/0154241 A1* | 6/2017 | Shambik | B60R 11/04 |
| 2018/0222426 A1* | 8/2018 | Foltin | B60R 22/46 |
| 2018/0225971 A1* | 8/2018 | Foltin | B60T 7/22 |
| 2018/0253595 A1* | 9/2018 | Aoki | G06K 9/00805 |
| 2018/0281786 A1* | 10/2018 | Oyaizu | G06K 9/00825 |
| 2021/0090357 A1* | 3/2021 | Diamond | G08G 1/205 |

* cited by examiner

*Primary Examiner* — Ryan Rink
(74) *Attorney, Agent, or Firm* — Coats & Bennett, PLLC

(57) ABSTRACT

Systems for collision avoidance for a vehicle. One or more inputs are used to determine an impending collision. Once determined, corrective actions are taken to reduce the severity of the collision. The corrective actions can avoid the collision and/or reduce the damage caused by the collision. The systems and methods can be performed at the vehicle based on data available to a control unit in the vehicle. The systems and methods can also be performed at a system level that controls one or more vehicles and/or objects.

20 Claims, 14 Drawing Sheets

SYSTEMS AND METHODS FOR REDUCING A SEVERITY OF A COLLISION

TECHNOLOGICAL FIELD

The present disclosure relates generally to the field of vehicle safety and, more particularly, to monitoring a vehicle that is within an environment and taking corrective action to lessen damage that is expected from an impending collision.

BACKGROUND

With the increasing abundance of machines in our environment, especially in industrial settings with the advent of devices such as automated robotic manufacturing, there is a corresponding increase in safety risks associated with collisions between humans, machines and other objects in the environment. Fortunately, we also live in an increasingly sensor rich environment that provides things such as accelerometers for speed and direction, GPS for positioning, and things such as Bluetooth and WiFi for connectivity and communications that can enable us to calculate position, speed, directionality, momentum, etc.

Many objects are equipped with sensors and communication technology to transmit data. Further, technology provides for sensors that are located away from objects to identify and determine aspects about the objects. For example, sensor data can be used to identify if the object is a car or a person or an inanimate object such as a house or tree. Sensor data can also be used to determine physical aspects about the object, such as velocity and direction of movement.

SUMMARY

The present application is directed to systems and methods of using sensor data to identify a potential collision between objects that are in an environment. The sensor data can further be used to minimize the severity of the collision.

One aspect is directed to a method of reducing a severity of a collision between a vehicle and an object that are both in an environment. The method comprises: determining expected locations of where each of the vehicle and the object will be located in the environment; identifying that a collision between the vehicle and the object is impending based on the expected locations; and adjusting one or more operational controls of the vehicle and changing the expected location of the vehicle and reducing the severity of the collision.

In another aspect, the method further comprises determining a criticality map of each of the vehicle and the object with each of the criticality maps comprising one or more higher critical zones and lower critical zones that are spaced apart in a non-overlapping arrangement, an expected severity of the collision is greater for the collision when an impact point of the collision occurs in one of the higher critical zones than in one of the lower critical zones.

In another aspect, the method further comprises changing a travel path of the vehicle and preventing the impact point of the collision from occurring at the higher critical zones on the vehicle and the object.

In another aspect, the method further comprises determining a mass of the object and adjusting the one or more operational controls of the vehicle based on the mass of the object.

In another aspect, adjusting the one or more operations controls of the vehicle and changing the expected location of the vehicle and reducing the severity of the collision comprises: determining a velocity of one or both of the vehicle and the object; determining a mass of one or both of the vehicle and the object; determining criticality maps of one or both of the vehicle and the object; and determining a new travel path of the vehicle based on one or more of the velocity, the mass, and the criticality maps.

In another aspect, the method further comprises determining the location of a person in the object based on images of the object taken from a camera on the vehicle and determining a new travel path for the vehicle based on the location of the person.

In another aspect, adjusting the one or more operational controls of the vehicle and changing the expected location of the vehicle and reducing the severity of the collision comprises autonomously controlling the vehicle based on one or more sensor readings taken at the vehicle.

In another aspect, adjusting the one or more operational controls of the vehicle and changing the expected location of the vehicle and reducing the severity of the collision comprises changing a travel path of the vehicle and avoiding the object.

In another aspect, the method further comprises obtaining a mass of the vehicle, a mass of the object, a criticality map of the vehicle, and a criticality map of the object prior to identifying that the collision between the vehicle and the object is impending.

One aspect is directed to a method of reducing a severity of a collision between a vehicle and an object that are both in an environment. The method comprises: determining a travel path of the vehicle in the environment; determining an expected location of the object in the environment; identifying that a collision between the vehicle and the object is impending based on the travel path and the expected location; and determining a new travel path for the vehicle in the environment and preventing a high criticality zone on at least one of the vehicle or the object from being impacted in the collision.

In another aspect, the method further comprises determining the new travel path based on a velocity of one or both of the vehicle and the object and a mass of one or both of the vehicle and the object.

In another aspect, the method further comprises: capturing images of the object; determining a location of a person in the object base on the images; and determining the new travel path based on the location of the person in the object.

One aspect is directed to a computing device configured to reduce a severity of a collision between a vehicle and an object that are both in an environment. The computing device comprises communications circuitry configured to communicate and processing circuitry. The processing circuitry is configured to: determine expected locations of each of the vehicle and the object in the environment at a time in the future; determine that a collision between the vehicle and the object is impending based on the expected locations; and in response to determining the impending collision, change a travel path of the vehicle and reduce a severity of the collision.

In another aspect, the computing device is located in the vehicle.

In another aspect, the computing device is located in a server located remotely from both of the vehicle and the object.

In another aspect, the computing device comprises a camera to capture one or more images of the object, and the processing circuitry is configured to identify the object based on the one or more images.

In another aspect, memory circuitry stores criticality maps of one or more of the vehicle and the object with the processing circuitry configured to change the travel path based on the one or more criticality maps.

In another aspect, the processing circuitry is configured to retrieve a mass of the object and the vehicle and to change the travel path based on the masses.

In another aspect, the processing circuitry is configured to adjust steering and braking of the vehicle to change the travel path.

In another aspect, the processing circuitry is configured to control the vehicle autonomously.

The features, functions and advantages that have been discussed can be achieved independently in various aspects or may be combined in yet other aspects, further details of which can be seen with reference to the following description and the drawings.

DETAILED DESCRIPTION

The present application discloses systems and methods for collision avoidance for a vehicle. One or more inputs are used to determine an impending collision. Once determined, corrective actions are taken to reduce the severity of the collision. The corrective actions can avoid the collision and/or reduce the damage caused by the collision. The systems and methods can be performed at the vehicle based on data available to a control unit in the vehicle. The systems and methods can also be performed at a system level that controls one or more vehicles and/or objects. Other examples include functionality at both the vehicle and a remote site to determine and reduce the severity of a collision.

Figure 1:
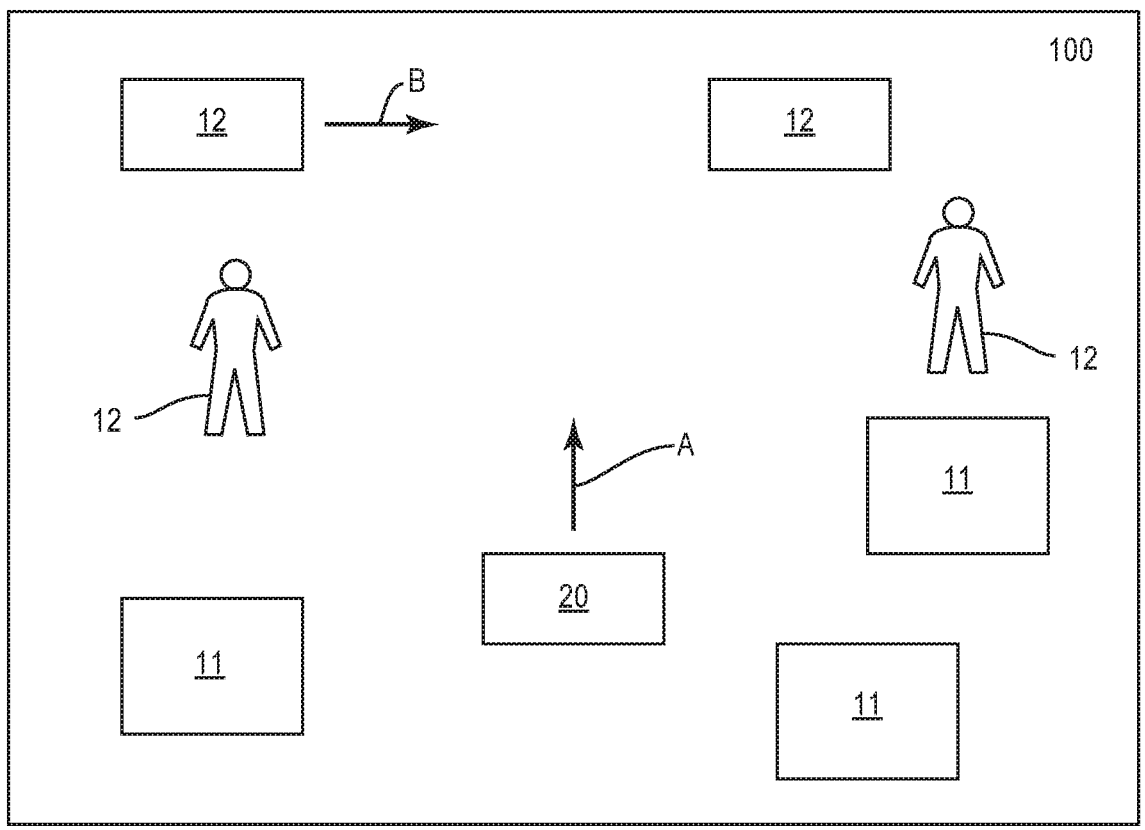
FIG. 1 is schematic diagram of a vehicle and objects located within an environment.

FIG. 1 illustrates a vehicle 20 operating in an environment 100. The vehicle 20 and environment 100 can include a wide variety of contexts. Examples include but are not limited to a car driving along a street, a forklift operating in a warehouse, a robot operating in a manufacturing environment, an aircraft operating on the ground including aircraft to aircraft taxiing, an aircraft operating during flight, ground handling vehicles that operate around aircraft, and a watercraft operating in one or both of above water and below water. The environment 100 may have fixed dimensions, such as but not limited to within a building or within a room of a manufacturing operation. The environment 100 may be relatively boundless, such as but not limited to the oceans, the sky, and road systems across a state or country.

The vehicle 20 is configured to move within the environment 100 in various different directions such as indicated by arrow A. The movement can occur in two or three dimensional space. The environment 100 also includes stationary objects 11 that are fixed in position. Examples of stationary objects 11 include but are not limited to buildings, shelving, machinery, fuel tanks, trees, reefs, and mountains. The environment 100 also includes movable objects 12 such as but not limited to other vehicles and people.

Figure 2:
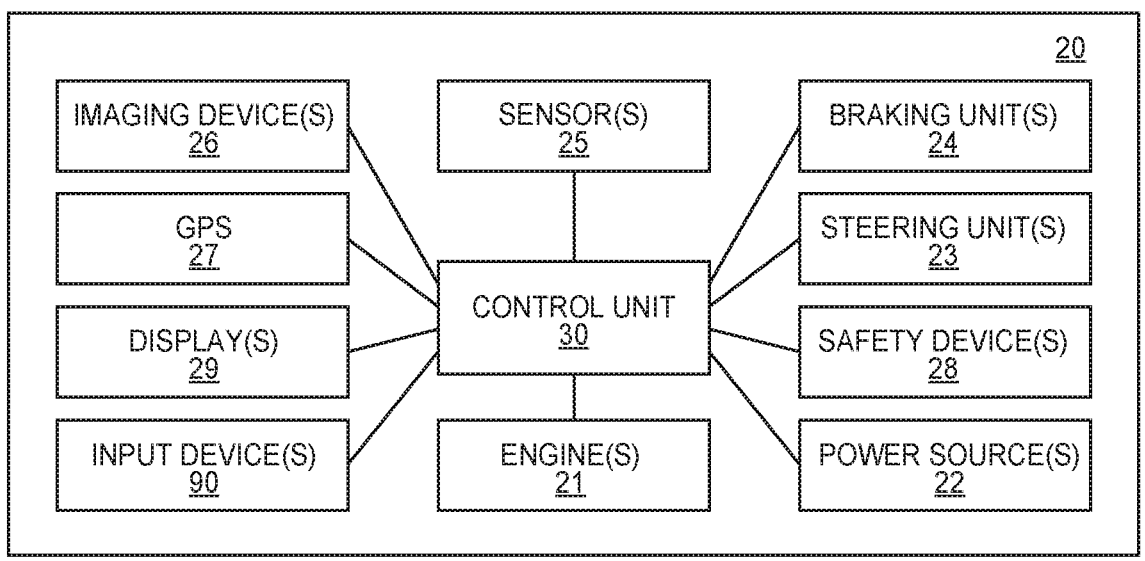
FIG. 2 is a schematic diagram of a vehicle used in an environment.

FIG. 2 schematically illustrates the operational components of the vehicle 20. The vehicle 20 includes one or more engines 21 that propel the vehicle 20. Examples of engines 21 include but are not limited to an internal combustion engine, an electric motor, a turbine engine, and a marine engine. A power source 22 provides energy to operate the engine 21. One or more safety devices 28 deploy/activate prior to and/or during and/or immediately after a collision. Safety devices 28 include but are not limited to air bags, computer-assisted braking, and dampers.

The vehicle 20 further includes a steering unit 23 to control the direction of motion. A braking unit 24 slows the speed of the vehicle 20 and can include brakes applied to one or more of the tires, or a deployable control surface on watercraft or aircraft (e.g., spoilers). Each of the steering unit 23 and braking unit 24 can include one or more input devices for an operator. For example, the steering unit 23 can include a steering wheel or joystick, and the braking unit 24 can include a brake pedal or switch.

One or more sensors 25 detect one or more aspects about the vehicle 20 and/or the environment 100. One or more of the sensors 25 can detect aspects about the vehicle 20, such as but not limited to velocity, acceleration, orientation, altitude, depth, and amount of fuel remaining in the power source 22. One or more of the sensors 25 can detect aspects about the environment 100. Examples include velocity and/or acceleration of a movable object 12, direction of movement of a movable object 12, distances between the vehicle 20 and objects 11, 12, and environmental conditions within the environment 100 such as precipitation, amount of light (e.g., daytime or nighttime).

One or more imaging devices 26 capture images of the environment 100. The imaging device 26 can capture still or motion images. In one example, the imaging devices 26 are cameras.

A global positioning system 27 determines the geographic location of the vehicle 20 in the environment 100. The global positioning system 27 can also provide timing for the actions of the vehicle 20.

One or more displays 29 provide for conveying data to a person in the vehicle 20. One or more input devices 90 such as but not limited to a keyboard, joystick, touch screen provide for the person to input commands to the control unit 30.

Figure 3:
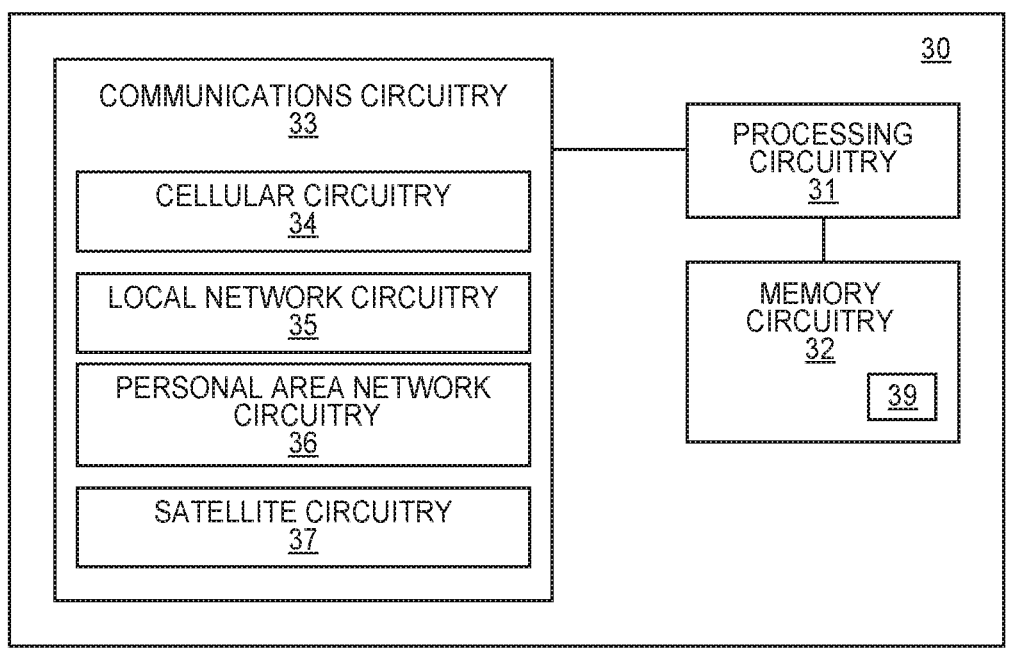
FIG. 3 is a schematic diagram of a control unit of a vehicle.

The control unit 30 controls the operation of the vehicle 20. As illustrated in FIG. 3, the control unit 30 includes processing circuitry 31 and memory circuitry 32. The processing circuitry 31 controls overall operation of the vehicle 20 according to the instructions 39 stored in the memory circuitry 32. The processing circuitry 31 can include one or more circuits, microcontrollers, microprocessors, hardware, or a combination thereof. Memory circuitry 32 includes a non-transitory computer readable storage medium storing the instructions 39, such as a computer program product, that configures the control unit 30 to implement one or more of the techniques discussed herein. Memory circuitry 32 can include various memory devices such as, for example, read-only memory, and flash memory. Memory circuitry 32 can be a separate component as illustrated in FIG. 3, or can be incorporated with the processing circuitry 31. Alternatively, the processing circuitry 31 can omit the memory circuitry 32, e.g., according to at least some embodiments in which the processing circuitry 31 is dedicated and non-programmable.

The control unit 30 is configured to provide for communication functionality for the vehicle 20. Communications circuitry 33 provides for both incoming and outgoing communications and can enable communication between the vehicle 20 and objects 11, 12 in the environment 100 as well as one or more remote sources outside of the environment 100. The communications circuitry 33 can include one or more interfaces that provide for different methods of communication. The communications circuitry 33 can include cellular circuitry 34 that provides a cellular interface that enables communication with a mobile communication network (e.g., a WCDMA, LTE, or WiMAX network). The communication circuitry 33 can include local network circuitry 35 such as a WLAN interface configured to communicate with a local area network, e.g., via a wireless access point. An exemplary WLAN interface could operate according to the 802.11 family of standards, which is commonly known as a WiFi interface. The communication circuitry 33 can further include personal area network circuitry 36 with a personal area network interface, such as a Bluetooth interface. This can also include circuitry for near field communications that provides for short-range wireless connectivity technology that uses magnetic field induction to permit devices to share data with each other over short distances. The communications circuitry 33 can also include satellite circuitry 37 that provides for satellite communications.

In one example as illustrated in FIG. 3, the communications circuitry 33 is incorporated into the control unit 30. In another example, the communications circuitry 33 is a separate system that is operatively connected to and controlled by the control unit 30.

Figure 4:
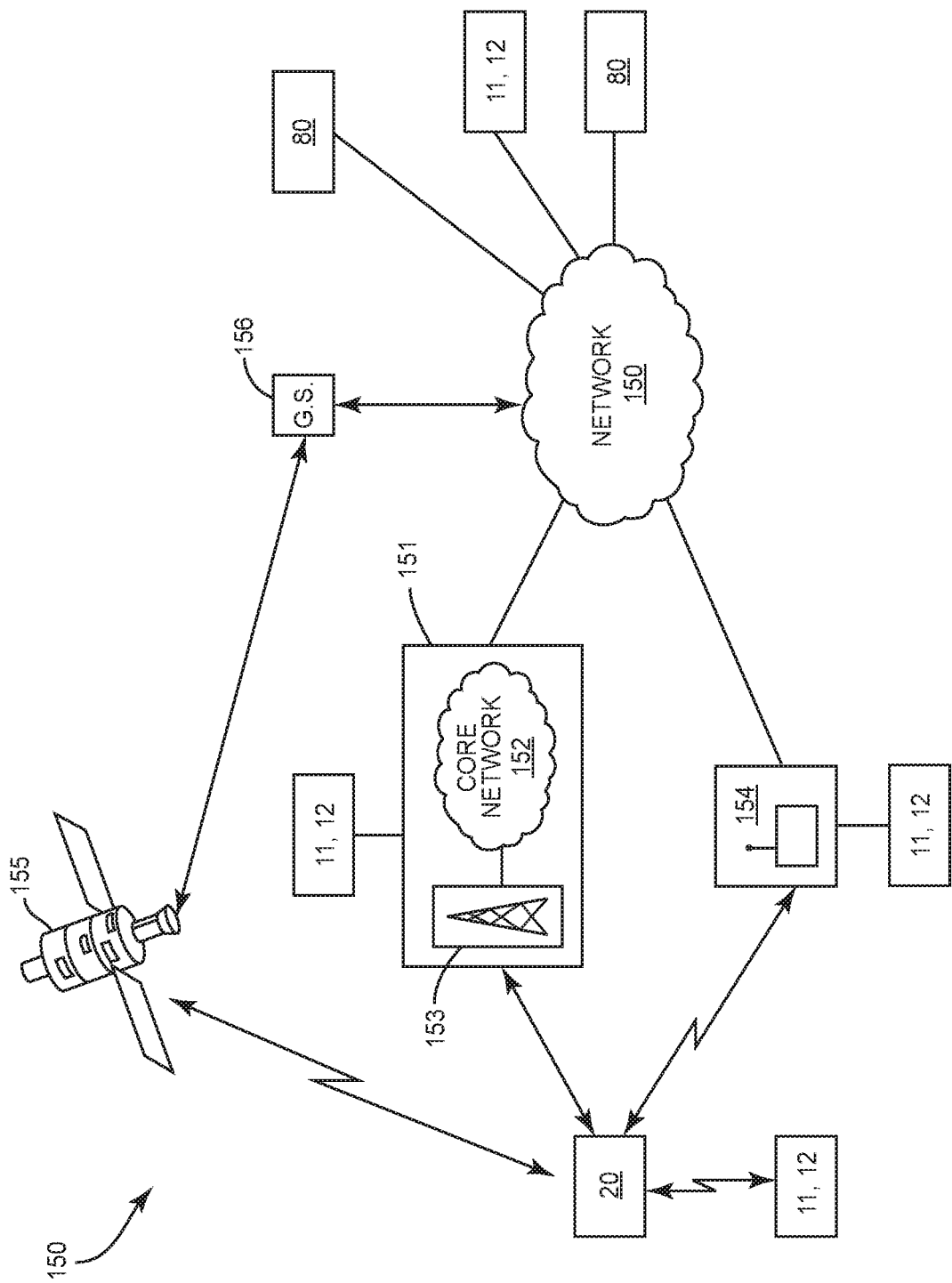
FIG. 4 is a schematic diagram of a wireless communications network.

FIG. 4 illustrates a wireless communications network 150 through which the vehicle 20 communicates and receives data. The wireless communications network 150 includes a mobile communication network 151 (e.g., a WCDMA, LTE, or WiMAX network). The mobile communication network (MCN) 151 includes a core network 152 and a radio access network (RAN) 153 including one or more base stations. The MCN 151 can be a conventional cellular network operating according to any communication standards now known or later developed. For example, the MCN 151 includes a Wideband Code Division Multiple Access (WCDMA) network, a Long Term Evolution (LTE) network, or WiMAX network. The MCN 151 is further configured to access the packet data network (PDN) 150. The PDN 150 can include a public network such as the Internet, or a private network.

The wireless communications network 150 includes a Wireless Local Area Network (WLAN) 154 that operates according to the 802.11 family of standards, which is commonly known as a WiFi interface. Communications can also be available through one or more satellites 155. The satellites 155 can communicate through one or more of ground stations 156, or can communicate directly with one or more of the other components.

One or more of the objects 11, 12 in the environment 100 are configured to communicate to and/or from the vehicle 20 through the wireless communications network 150 and/or a personal area network such as Bluetooth interface.

FIG. 4 includes a wireless communications network 150 featuring different modes of communications. Other examples can include additional and/or other communications modes. Other examples include few modes than those illustrated in FIG. 5. In one specific example, the wireless communications network 150 includes a single mode of communications (e.g., a WLAN mode).

Figure 5:
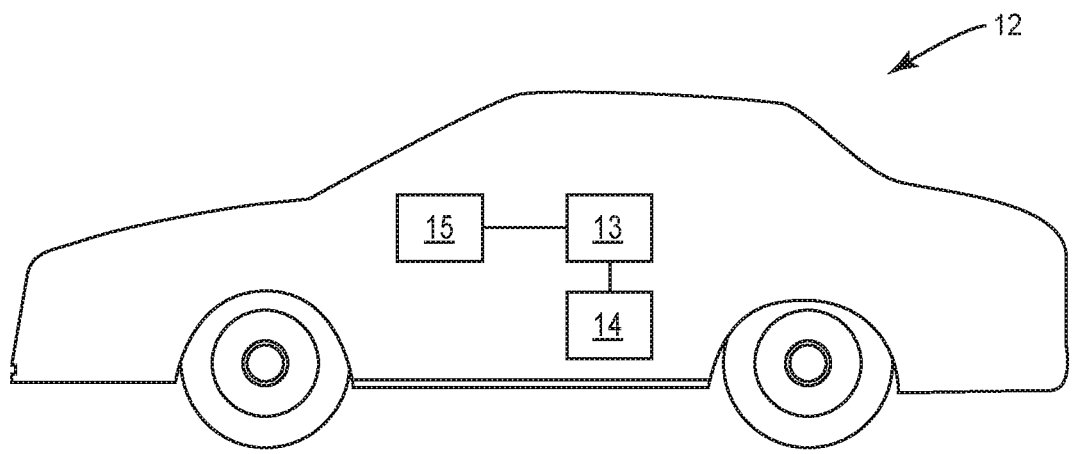
FIG. 5 schematic diagram of a movable object that operates in an environment.

One or more objects 11, 12 in the environment 100 are configured to communicate with the vehicle 20. FIG. 5 includes an example of an object 12 (e.g., a car) that includes processing circuitry 13 and memory circuitry 14. The processing circuitry 13 controls the operation of the object 12 and can include one or more circuits, microcontrollers, microprocessors, hardware, or a combination thereof. Memory circuitry 14 includes a non-transitory computer readable storage medium storing the program instructions, such as a computer program product, that configures the processing circuitry 13 to implement one or more of the techniques discussed herein. Memory circuitry 14 can include various memory devices such as, for example, read-only memory, and flash memory. Communications circuitry 15 provides for one or more of ingoing and outgoing communication. The communications circuitry 15 enables communication with the vehicle 20. The communications circuitry 15 can include one or more interfaces that provide for different methods of communication. The communications circuitry 15 can include one or more of a cellular interface that enables communication with a mobile communication network (e.g., a WCDMA, LTE, or WiMAX network), a local network such as a WLAN interface, a personal area network such as a Bluetooth interface, near field communications, and satellite communications.

Figure 6:
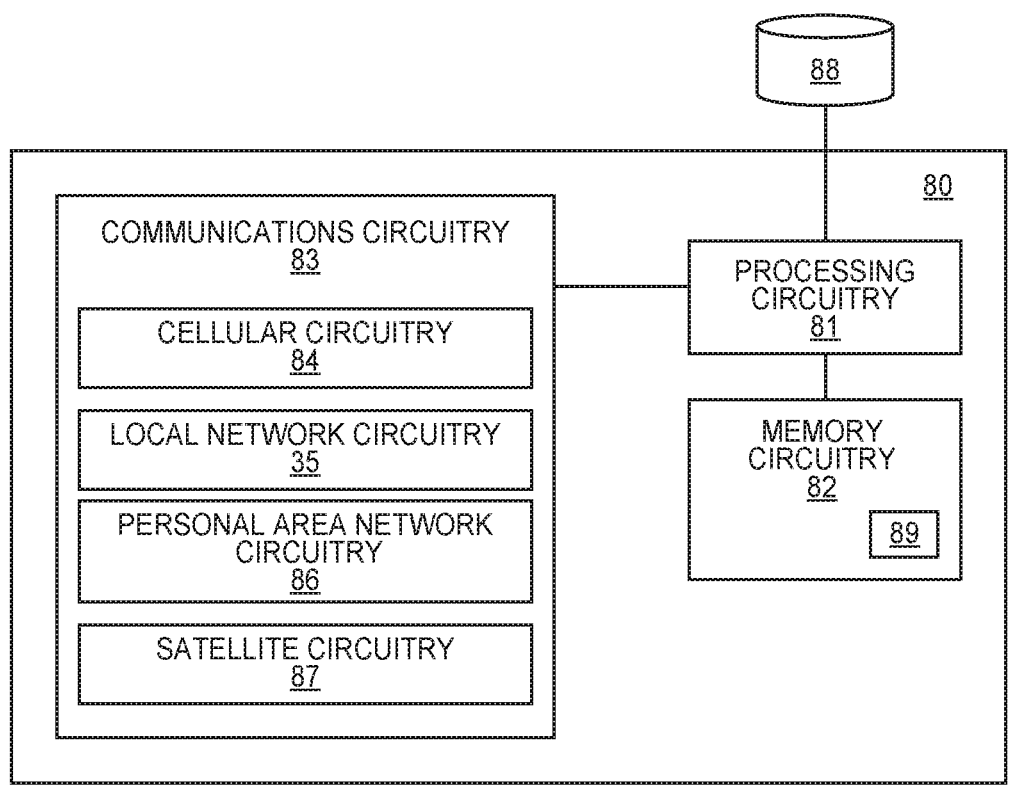
FIG. 6 is a schematic diagram of a remote server.

As illustrated in FIG. 6, a server 80 that is remote from the vehicle 20 is a source of data. The server 80 can be positioned in the environment 100 or can be distanced away from the environment 10. The server 80 includes processing circuitry 81 that may include one or more microprocessors, microcontrollers, Application Specific Integrated Circuits (ASICs), or the like, configured with appropriate software and/or firmware. A computer readable storage medium (shown as memory circuitry 82) stores data and computer readable program code that configures the processing circuitry 81 to implement the techniques described above. Memory circuitry 82 is a non-transitory computer readable medium, and may include various memory devices such as random access memory, read-only memory, and flash memory. Memory circuitry 82 can include instructions 89 that when run by the processing circuitry 81, cause the processing circuitry 81 to perform various functions. Communications circuitry 83 can include cellular circuitry 84 that provides a cellular interface that enables communication with a mobile communication network (e.g., a WCDMA, LTE, or WiMAX network), local network circuitry 85 such as a WLAN interface configured to communicate with a local area network, such as WiFi that operates according to the 802.11 family of standards, personal area network circuitry with a personal area network interface, and satellite circuitry 87 that provides for satellite communications. A database 88 is stored in a non-transitory computer readable storage medium (e.g., an electronic, magnetic, optical, electromagnetic, or semiconductor system-based storage device). The database 88 can be local or remote relative to the server 80.

Figure 7:
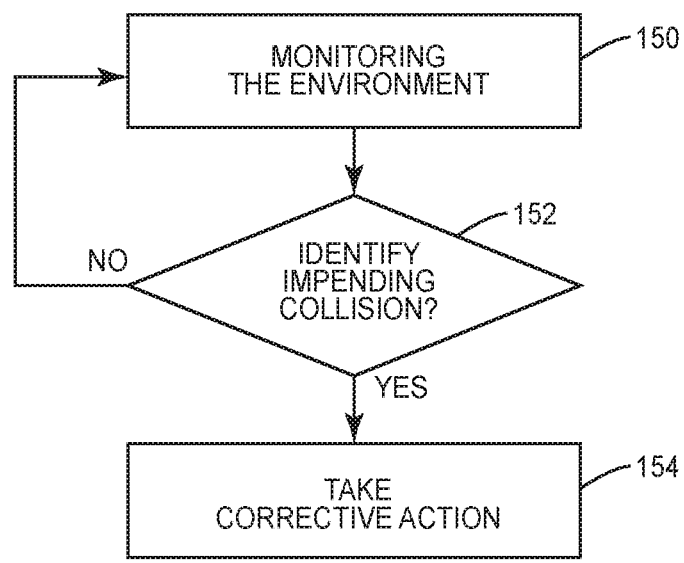
FIG. 7 is a flowchart diagram of a method of reducing a severity of a collision in an environment.

FIG. 7 illustrates a method of preventing the severity of an oncoming collision. The method includes the control unit 30 monitoring the environment 100 around the vehicle 20 (block 150). Based on the data from monitoring the environment 100, the control unit 30 identifies an impending collision involving the vehicle 20 (block 152). Corrective actions are taken to reduce the severity of the collision (block 154).

Monitoring the Environment

The control unit 30 obtains data about one or more of the environment 100 and objects 11, 12 in various manners. The vehicle 20 can also obtain data about itself and its actions in the environment 10.

Data about one or more of the environment 10, vehicle 20, and objects 11, 12 can be stored in the memory circuitry 32. This can include the data being stored prior to the vehicle 20 entering into the environment 10. For example, the memory circuitry 32 includes data about a manufacturing facility for a vehicle 20 such as a forklift that will work within a manufacturing building.

In another example, a car includes data about a geographic location where the owner lives. The data stored in the memory circuitry 32 can include details about the vehicle 20, such as the size, identification, safety devices, braking capacity, mass, mass distribution, and criticality map.

Data can also be acquired by the control unit 30 as the vehicle 20 operates in the environment 10. This can include receiving communications from one or more of the objects 11, 12 in the environment 10. In one example, the control unit 30 transmits a signal requesting data from the objects 11, 12. The requesting signal can be transmitted at various timing intervals. In another example, the control unit 30 signals an object 11, 12 that is identified through image recognition.

This can also include data from the one or more sensors 25 and data derived from the one or more images captured by the image devices 26. The sensors 25 can provide data about the movement of the vehicle 20 such as speed, altitude, and depths. Sensors 25 can also provide data about the weather, such as temperature and precipitation. In another example, the GPS 27 provides the location of the vehicle 20 in the environment 10.

Data can be obtained from the server 80 that is accessed through the wireless communications network 150. The server 80 can be remotely located away from the environment 10, or can be located within the environment 10. The control unit 30 in the vehicle 20 can also obtain data from one or more remote sources 86 as illustrated in FIG. 4. The remotes sources 86 can include websites, other networks, and others that include data about the environment 10.

In another example, the remote server 80 receives data from one or more objects 11, 12 in the environment 10. For example, one or more of the objects 11, 12 periodically transmits data about the object 11, 12, such as position, velocity, altitude, etc. In another example, the remote server 80 receives signals from one or more sensors that are located in the environment 100 that detect the data. In the various examples, the remote server 80 maintains the current status of the environment 100 which is accessed by the control unit 30.

In one example, the control unit 30 receives the data from the various sources. In another example, the control unit 30 receives raw data that is then processed by the control unit 30. The data can be related to the vehicle 20 itself, such as position of the vehicle 20 in the environment 10, the direction of travel, number of passengers, altitude, depth, speed, and acceleration. The data can be related to other stationary objects 11, including location, mass, and size. Data related to movable objects 12 can include velocity, accelerations, depth, altitude, mass, criticality map, and number of passengers.

The vehicle 20 can receive the data from other components in various manners. In one example, the vehicle 20 identifies an object 11, 12 through image recognition and then requests data from the object 11, 12. In another example, the vehicle 20 periodically transmits queries to objects 11, 12 within a predetermined range of the vehicle 20. The queries request data about the object 11, 12. In one example, the vehicle 20 transmits a data request to the server 80 at a beginning of the process, such as when the vehicle 20 is activated or when the vehicle 20 enters into the environment 10. In another example, the vehicle 20 queries another object 11, 12 when the object 11, 12 is within a predetermined range of the vehicle 20.

In one example, the control unit 30 determines and/or receives a mass of an object 11, 12 and a velocity of the object 11, 12, as well as a mass of the vehicle 20 and a velocity of the vehicle 20. This data can be used to determine how to reduce the severity of the collision. The control unit 30 can also determine and/or receive a distribution of the mass of each of the object 11, 12 and the vehicle 20. The control unit 30 can also determine and/or receive a criticality map of the object 11, 12 and the vehicle 20.

Another source of data are portable electronic devices worn by persons in the environment 100. These persons can be those who are operating a movable object 12 or otherwise in the environment 100. The control unit 30 can send and/or receive data from these sources to further obtain a more full and accurate reading of the environment 100 and objects 11, 12 in the environment 100.

Identify an Impending Collision

Figure 8:
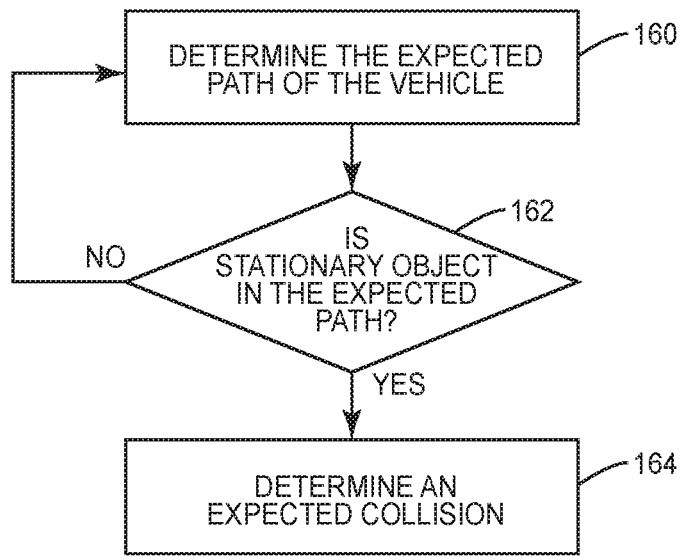
FIG. 8 is a flowchart diagram of a method of determining an impending collision with a stationary object.

The control unit 30 identifies that there is an impending collision between the vehicle 20 and another object 11, 12 in the environment 100. FIG. 8 illustrates a method of determining an impending collision with a stationary object 11 in the environment 10. The control unit 30 determines an expected path of the vehicle 20 based on the current direction and speed of travel of the vehicle 20 (block 160). In one example, the control unit 30 determines that the vehicle 20 will maintain the current path and speed. In another example, the control unit 30 has data indicating the expected path, such as a map of the road on which the vehicle 20 is currently traveling or a flight path of an aircraft. In another example, the control unit 30 adjusts the expected path and/or speed based on data. For example, a sharp bend in the road on which the vehicle 20 is traveling in combination with the speed of the vehicle 20 can cause the control unit 30 to factor for the vehicle skidding while traversing the turn. In another example, expected turbulence obtained from another aircraft that has recently traveled through the environment 100 can cause the control unit 30 to shift the expected path.

The vehicle 20 then determines whether there is a stationary object 11 in the expected path (block 162). In one example, the location of the stationary object 11 is determined by the image recognition functionality based on one or more images taken by the imaging device 26. The location can also be based on a map of the environment 100 either stored in the memory circuitry 32, obtained from the server 80, or obtained from a remote source 86 (through the wireless communications network 150).

If the expected path intersects with the stationary object 11, the control unit 30 determines there will be an impending collision (block 164). If the expected path does not intersect the stationary object 11, the process continues as the vehicle 20 moves in the environment 100.

Figure 9:
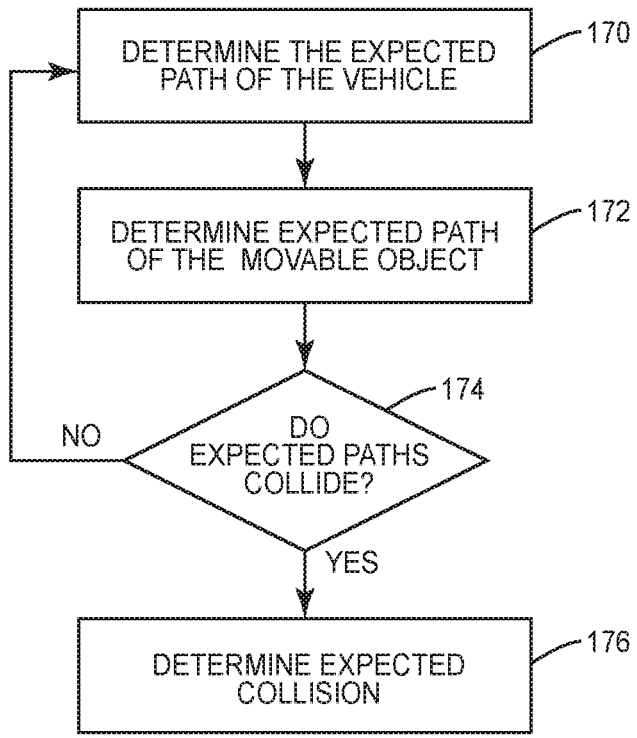
FIG. 9 is a flowchart diagram of a method of determining an impending collision with a movable object.

FIG. 9 illustrates a method of determining an impending collision with a movable object 12. The control unit 30 determines the expected path of the vehicle 20 (block 170) as described above. The control unit 30 also determines the expected path of a movable object 12 (block 172). This includes determining that there is a movable object 12 in the area of the expected path, determining data as possible about the movable object 12, and determining the expected path based on the available data. If the expected paths of the vehicle 20 and the movable object 12 collide (block 174), an impending collision is determined (block 176). If the expected paths do not collide, the process continues.

Take Corrective Action

After the control unit 30 determines an expected collision will occur, the control unit 30 takes corrective action to reduce the severity of the collision. In one example, this includes preventing the collision from occurring. In another example, reducing the severity includes reducing injuries to persons that could be involved in the collision including those in either the vehicle 20 or object 11, 12 or in the nearby environment 100 (e.g., pedestrians). In another example, reducing the severity includes reducing the damage to the vehicle 20, to the object 11, 12, or combination of both. Reducing the severity can also include secondary effects of a collision, such as loss of life away from the actual collision such as on the ground for an in-air collision of an aircraft. Severity can also include later operational issues that result from the collision, such as but not limited to delay of operations and cost of replacing the effected equipment that were damaging in the collision.

Figure 10:
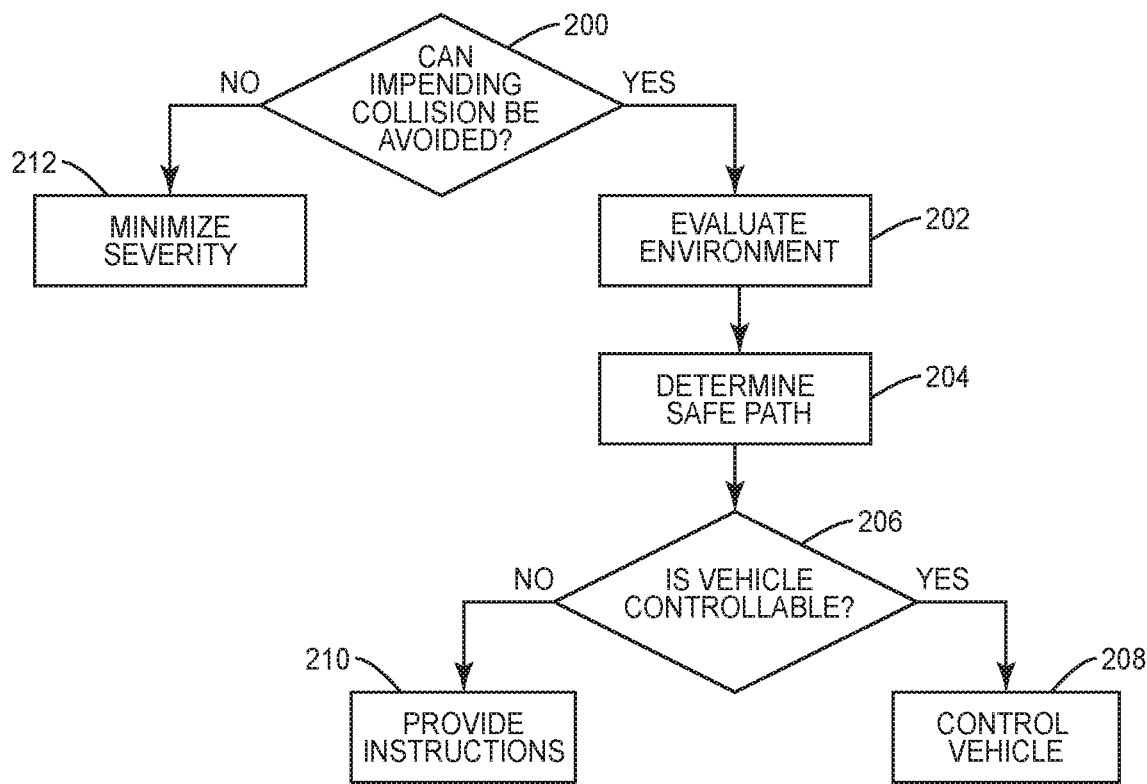
FIG. 10 is a flowchart diagram of a method of taking corrective action after determining there is an expected collision.

FIG. 10 illustrates a method of taking corrective action by the control unit 30 after determining there is an expected collision. The control unit 30 determines whether the collision can be avoided (block 200). Avoidance may include but is not limited to one or more of steering the vehicle 20 away from its expected path, changing the speed of the vehicle 20 including stopping the vehicle 20, accelerating the vehicle 20, and differential braking of the vehicle 20.

If the collision can be avoided, the control unit 30 evaluates the environment 100 to ensure the potential evasive action by the vehicle 20 does not cause additional damage (block 202). For example, the control unit 30 evaluates whether there are any objects 11, 12 that are or will be in the area that would be impacted by the change in the expected path. For example, other cars that are driving along the road, one or more persons walking along a pathway, or a tree that is located next to an intersection. Based on the data about the environment 100, the control unit 30 determines a safe path for the vehicle 20 to travel that avoids the collision (block 204).

Some vehicles 20 can be controlled by the control unit 30. The control is based on data received from one or more sensors 25 and imaging device 26. If the vehicle 20 can be controlled by the control unit 30 (block 206), the control unit 30 takes over one or more of the functions of the vehicle 30 (block 208). For example, the control unit 30 controls the steering unit 23 or the braking unit 24 to change the expected path and avoid the collision. If the vehicle 20 cannot be controlled by the control unit 30 (block 206), the control unit 30 provides instructions to the vehicle operator (block 210). In one example, this includes displaying instructions on the display 29. In another example, the control unit 30 broadcasts audio instructions that can be heard and acted on by an operator of the vehicle 20.

If the collision is not avoidable (block 200), the control unit 30 determines a course of action to minimize the severity (block 212).

Figure 11:
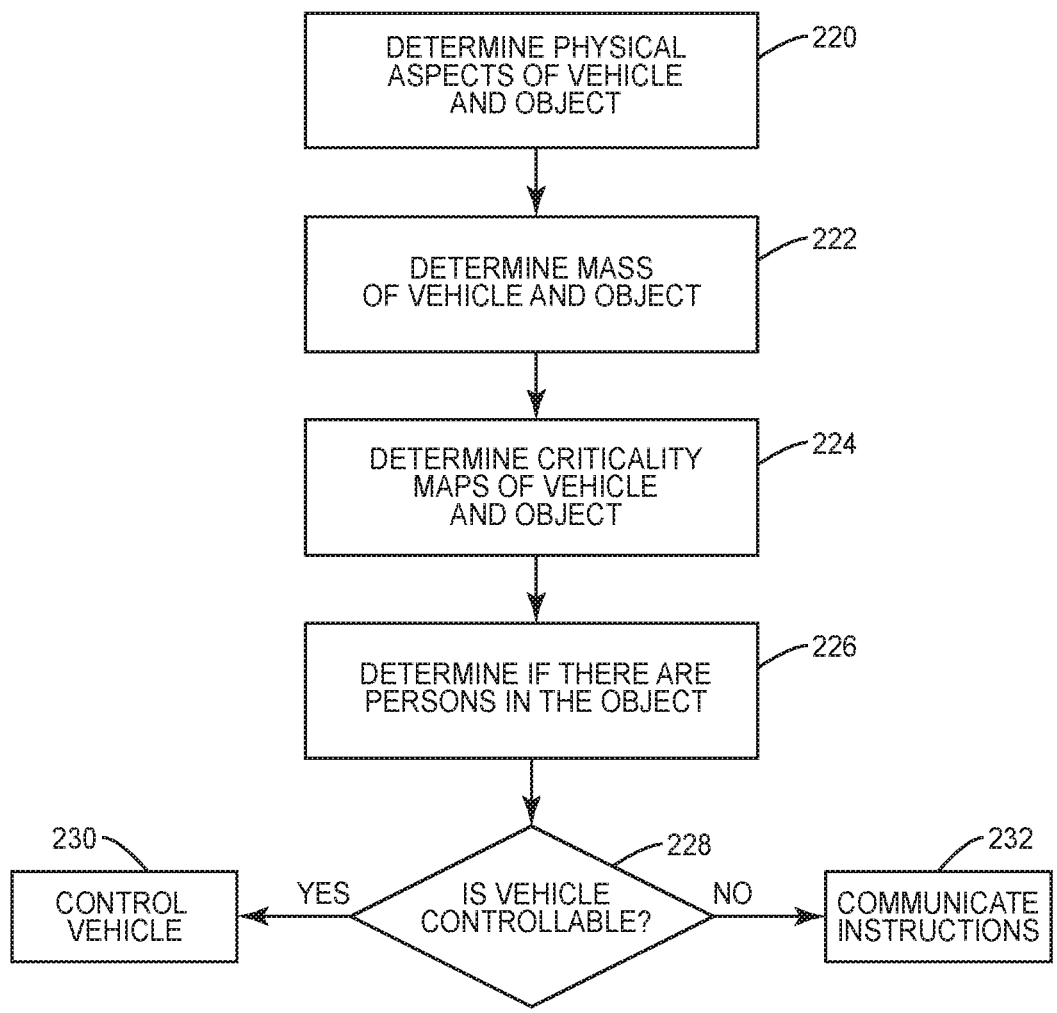
FIG. 11 is a flowchart diagram of a method of minimizing the severity of a collision that cannot be avoided.

FIG. 11 illustrates a method of minimizing the severity of a collision that cannot be avoided. The control unit 30 determines physical aspects of the vehicle 20 and the object 11, 12 that will be involved in the collision (block 220). The physical aspects for one or both of the vehicle 20 and object 11, 12 can include but are not limited to the direction of movement, speed, mass, mass distribution, location in the environment 10, and acceleration/deceleration rates. The physical aspects can be previously obtained by the control unit 30 at various times, including prior to the determination of the impending collision and after the determination of the impending collision. In one example, the control unit 30 maintains updated data on the vehicle 20 and object 11, 12 and continuously receives updates from one or more of the sensors 25, imaging device 26, server 80, and remote sources 86.

The control unit 30 determines the mass of the vehicle 20 and object 11, 12 (block 222). This can also include the distribution of mass within the vehicle 20 and object 11, 12. In one example, the mass of the vehicle 20 is maintained in the memory circuitry 32 when the vehicle 20 enters into the environment 10. In another example, the mass of the vehicle 20 is obtained from the server 80 either prior to or after the determination of the impending collision.

The control unit 30 also uses the mass and velocity of both the vehicle 20 and object 11, 12. This data is indicative of the potential severity of the collision. The greater the mass and velocity of the vehicle 20 or object 11, 12, the greater the chances for a more severe collision. The mass and velocity also provide for the control unit 30 to determine the differential momentum of the vehicle 20 and movable object 12.

The mass of the object 11, 12 is obtained in various manners. In one example, the mass is determined through a communication from the object 11, 12, a remote source 86, or the remote server 80. The mass can also be determined based on images recorded by the imaging device 26 and calculated based on a size of the object 11, 12 and an identification of the object based on image recognition functionality. In another example, the control unit 30 identifies the object 11, 12 based on image recognition (e.g., another vehicle, a building, a tree) and determines the mass based on data stored in the memory circuitry 32 or data received from the server 80 or data source 85. For example, the control unit 30 determines that the object 12 is a pickup truck and basic mass data about pickup trucks is stored in the memory circuitry 32 or retrieved from the server 80 or remote source 86.

The control unit 30 determines criticality maps of the vehicle 20 and the object 11, 12 (block 224). A criticality map 40 includes two or more different zones that indicate the severity of a collision if the impact location occurred within the zone. The criticality maps of the vehicle 20 and object 11, 12 can be stored in the memory circuitry 32 or obtained from the server 80 or remote source 86 prior to or after the determination of the impending collision.

Figure 12:
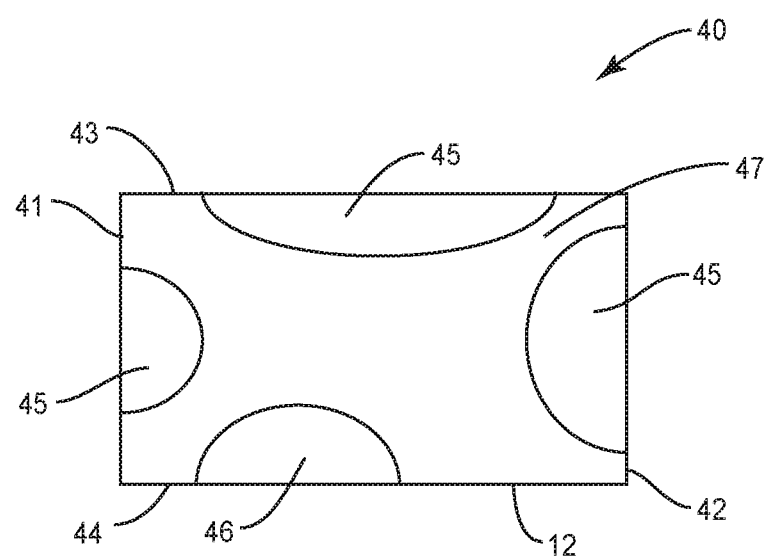
FIG. 12 is a schematic diagram of a criticality map of a movable object.
Figure 13:
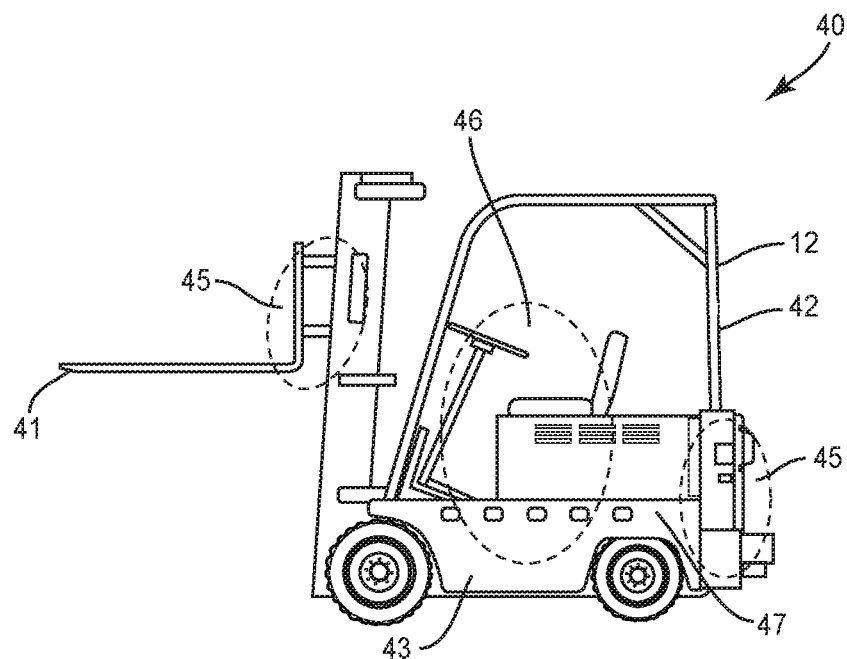
FIG. 13 is a schematic diagram of a criticality map of a forklift.

FIG. 12 illustrates a schematic representation of a criticality map 40 of a movable object 12, such as a car. FIG. 13 illustrates a criticality map 40 of a forklift 12. In one example, the criticality map 40 includes an outline of the object 12 that corresponds to the overall shape. In another example, the criticality map 40 does not include an outline. The outline includes a front end 41, back end 42, and lateral sides 43, 44. The terms "front" and "back" are relative and used to determine the general orientation when the object 12 is in motion. In this example, one or more low criticality zones 45, high criticality zones 46, and medium criticality zones 47 are indicated on the object 12. In this example, the low and high criticality zones 45, 46 are specifically indicated by outlined shapes. The medium criticality zone 47 is the remaining area of the object 12. The number, size, and shape of the different criticality zones can vary.

In one example, objects 11, 12 can include high criticality zones 45 in areas that could pose a danger to a person or otherwise inflict damage to a person. Using FIG. 13 as an example, the tips of the forks at the front end 41 are a high criticality zone 45 because they could injure a person in the vehicle 20. In another example, propellers or jet engines on an aircraft are high criticality zone 45 because of the inherent danger that the rotating propellers and spinning turbines pose to a person.

The criticality zones 45, 46, 47 provide for relative differences between an expected severity if an impact point of the collision were to occur in the zone. An impact point in a low criticality zone 45 is expected to be less severe than if the impact point were to occur in the high or medium criticality zones 46, 47. Likewise, an impact point of a collision in a medium criticality zone is expected to be more severe than if the impact point of the collision were to occur in a low criticality zone 45, but be less severe than if the impact point were to occur in a high criticality zone 46. The criticality zones 45, 46, 47 are necessary as the control unit 30 has determined that the collision is unavoidable and thus is calculating lessening the severity.

In one example, the criticality zones 45, 46, 47 are based on an expected passenger volume. Areas with an expected higher volume will have a higher criticality than areas with a lower expected volume. For example, a passenger seat of an auto can have a higher rating because of the increased likelihood of a person in the seat as opposed to a back seat of the auto. Criticality zones 45, 46, 47 can also be based on sensitive areas of the vehicle 20 and/or object 11, 12, such as fuel storage locations, control equipment, and areas that could inflict high amounts of damage to a person.

The criticality zones may vary depending upon the whether the object 11, 12 is operating. For example, jet engines and propellers on a moving aircraft 12 have a higher criticality rating than when the aircraft is not in use. The control unit 30 is able to determine a status of the object 11, 12 and can adjust the criticality map 40 based on the status.

The manner of differentiating between the different criticality zones 45, 46, 47 can depend upon one or more factors. One factor includes the effect of the collision on the one or more expected locations of persons in the object 11, 12. Using the example of FIGS. 12 and 13, the high criticality zones 46 are located at driver locations. In one example, the criticality zones are determined exclusively on the expected location of persons.

Figure 14:
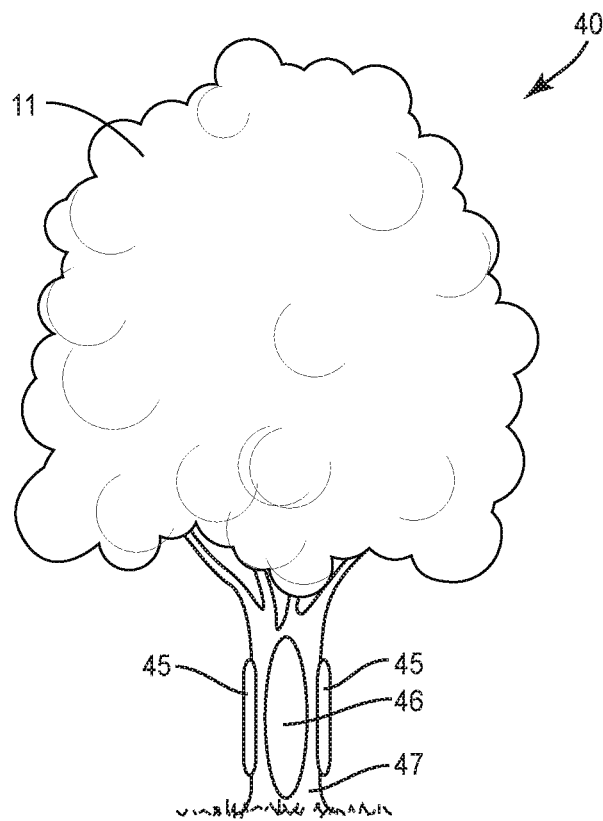
FIG. 14 is a schematic diagram of a criticality map of a tree.

Another factor can include the mass of the object 11, 12. For example, a severity of an impact location at a central location of an object 11, 12 may be more severe to the vehicle 20 than an impact location along an edge of the object 11, 12. Using FIG. 13 as an example, an impact zone at the front or back ends 41, 42 may be less severe than an impact point at a center of the lateral side 43. As illustrated in FIG. 14, the severity of impacting the edges of the stationary object 11 (i.e., a tree) is expected to be less severe than impacting against a central area of the tree.

Another factor that can be used to determine the criticality zones are the damage to one or both of the vehicle 20 and object 11, 12. For example, a collision in a rear panel of a lateral side 43 of a car is considered less critical that a collision at the front end 41. A collision to the engine is more critical than a collision to an area away from the engine.

Another factor that determines the criticality zones are the safety devices on the vehicle 20 and object 11, 12. For example, the vehicle 20 or movable object 12 can include one or more airbags to lessen the collision.

Returning to the overall method of FIG. 11, the control unit 30 determines if there are persons in the object 11, 12 (block 226). This can be based on image recognition of images obtained from the imaging device 26. In another example, this includes communications received from the object 11, 12 or a device that is worn by a person in the object 11, 12, such as a cell phone or laptop computer.

If the vehicle 20 can be controlled by the control unit 30 through data from one or more of the sensors 25 and image recognition (block 228), the control unit 30 controls the vehicle 20 and makes the necessary operational steps to minimize the collision (block 230). If the vehicle 20 is not controllable by the control unit (block 228), instructions are communicated to the operator of the vehicle 20 to take the necessary operation steps (block 232).

The control unit 30 may not include data to include each of the determinations of FIG. 11. In these circumstances, the control unit 30 uses the data available and makes a best determination of how to proceed. For example, the control unit 30 may not obtain the mass of the object 11, 12. The control unit 30 can either include a rough variable to make the determination, or can forgo this step of the process.

There may be situations in which the control unit does not have a criticality map 40 for the object 11, 12. In one example, the control unit identifies the object 11, 12 based on image recognition through the images from the imaging device 26. At least basic criticality zones can be determined based on the identification, such as the driver area and passenger areas being more critical than other areas of the object 11, 12. In another example, the control unit uses image recognition to determine if there are persons in the object 11, 12. The control unit determines the areas where the one or more persons are located as highly critical zones.

In one example, the control unit 30 determines that the vehicle 20 and/or object 11, 12 is unmanned (e.g., unmanned arial vehicle). The control unit 30 determines the severity of the collision for the one or more unmanned components based on aspects other than injuries and loss of life. Criteria include but are not limited to delay of operation and cost of equipment.

Figure 15A:
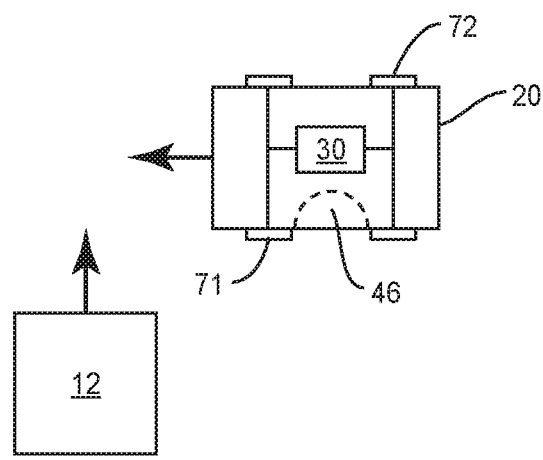
FIGS. 15A, 15B, and 15C are schematic diagrams of a vehicle taking corrective actions to reduce a severity of a collision.
Figure 15B:
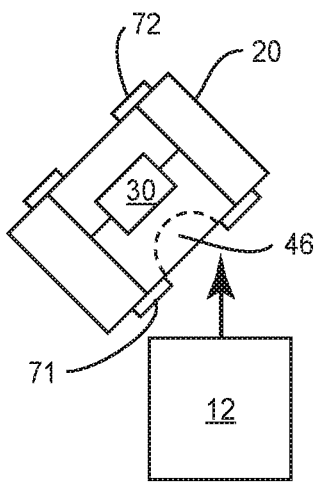
Figure 15C:
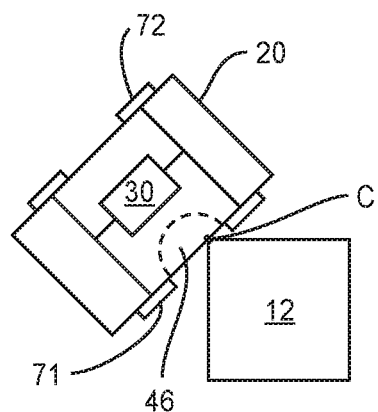

FIGS. 15A, 15B, and 15C illustrate a method of taking corrective actions and reducing a severity of a collision. As illustrated in FIG. 15A, the control unit 30 determines that an impending collision will occur based on the direction and speed of travel of the vehicle 20 and the movable object 12. This determination is based on data available to the control unit 30. In one example, the data can include but is not limited to one or more reading from sensors 25 on the vehicle 20, data obtained from communications with the movable object 12, data stored in memory circuitry 32, and data obtained from the server 80. Based on the data, the control unit 30 determines that the point of the collision will occur at the driver-side door. This area is a highly critical zone 46 based on a criticality map of the vehicle 20. This area is highly critical at least because it is the location of where the driver is positioned in the vehicle 20.

In this example, the control unit 30 can control the vehicle 20. To reduce the severity of the collision, the control unit 30 takes corrective measures to move the point of impact of the collision to a less critical location on the vehicle 20. In this example, the control unit 30 uses differential braking and acceleration to move the location. As illustrated in FIG. 15B, the decreases power to the driver front tire 71 and/or adds braking to the driver front tire 71. Concurrently, power is increased to the passenger rear tire 72. The control unit 30 can further adjust the steering unit 23 to turn away from the current path. These changes cause the vehicle 20 to rotate away from the previous path.

As illustrated in FIG. 15C, the rotation of the vehicle 20 causes the point of impact C to be on the rear quarter section of the vehicle 20 away from the highly critical zone 46. This change in position of the vehicle 20 lessens the severity of the collision and increase the probability of the driver of the vehicle 20 being injured. This change can also lessen the damage to the vehicle 20 and/or the movable object 12.

Figure 16A:
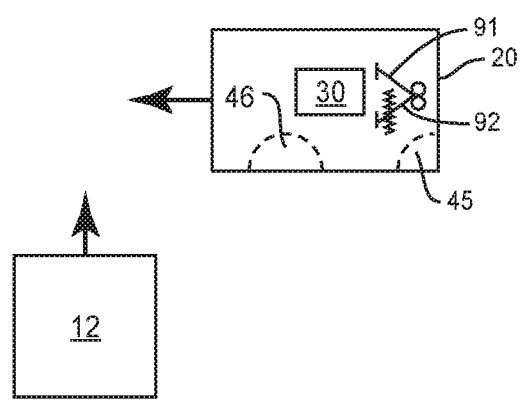
FIGS. 16A, 16B, and 16C are schematic diagrams of a vehicle taking corrective actions to reduce a severity of a collision.
Figure 16B:
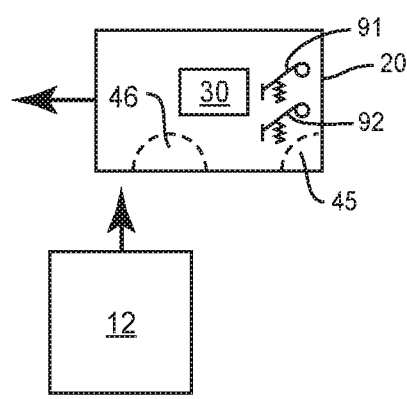
Figure 16C:
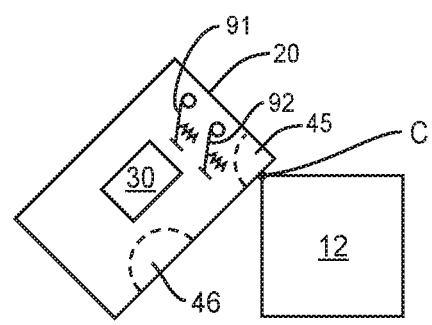

FIGS. 16A, 16B, and 16C illustrate another example of corrective actions taken by the control unit 30 to lessen the severity of a collision. As illustrated in FIG. 16A, the control unit 30 determines an impending collision will occur between the vehicle 20 and the movable object 12. The expected point of impact is in the driver-side door which is a highly critical zone 46 on the vehicle 20. The impending collision and expected point of contact of the collision is based on the data available to the control unit 30.

In this example, the vehicle 20 is equipped with dampers 91, 92. As illustrated in FIG. 16B, the control unit 30 causes the dampers 91, 92 to axially relax thus causing a spring-loaded mass on each to be released. As illustrated in FIG. 16C, the release of the mass causes a pendulum effect that causes the vehicle 20 to rotate relative to the previous path. This proactive rotational swing delays the impact and causes the point of impact C to occur at the driver quarter-panel location that is a low critical area 45.

The control unit 30 is further configured to analyze the various corrective actions that were taken during various events and determine the effectiveness. In one example, the control unit 30 analyzes the lead time that an impending collision is determined. Increasing the time between the determination and the actual collision increases the options for avoiding a similar collision in the future.

Another example is analyzing the data that was available to the control unit 30 at the time corrective actions were taken. Increasing the ability to obtain additional data can provide for more accurate decision making in determining actions regarding collisions in the future.

The control unit 30 can also analyze the actual corrective actions taken and their effectiveness. For example, braking patterns applied to controllable-vehicles 20 are analyzed to determine effectiveness. Similarly, steering patterns or acceleration/deceleration changes are analyzed to determine the effectiveness with collisions.

Returning to FIG. 3, the memory circuitry 32 can include data necessary for the processing circuitry to determine the impending collision and/or the corrective actions. In one example, this data is stored in the memory circuitry 32. In another example, the data is maintained in a separate database.

A first type of data is object mass and meta data. This includes the total mass and mass distribution of the vehicle 20 and/or objects 11, 12. Data also includes criticality maps 40 for the vehicle 20 and/or objects 11, 12. Data can include object identification to enable the processing circuitry to identify objects 11, 12 based on various methods, such as but not limited to image recognition and determination through sensor readings. Data can also include directional information of movement within the environment 100, orientation of the vehicle 20 and/or objects 11, 12.

A second type of data includes momentum collision equations/rules. This data provides for the physics calculations to determine the various aspects of the vehicle 20 and/or objects 11, 12. This can include various momentum and mass calculations, speed calculations, speed, and acceleration/deceleration rates.

Figure 17:
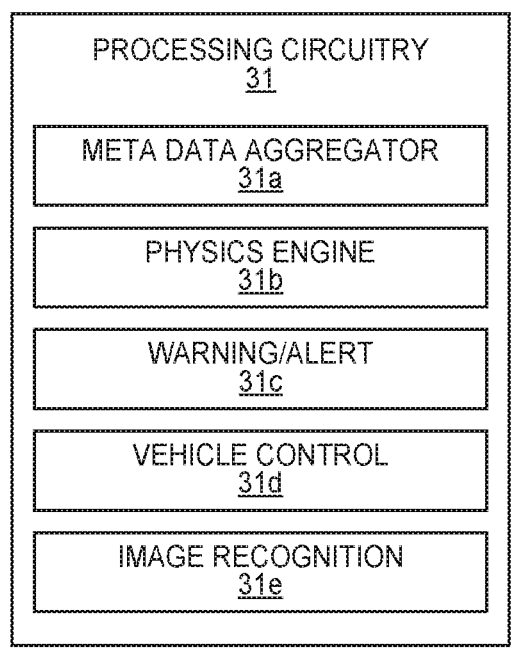
FIG. 17 is a schematic is a functional block diagram illustrating processing circuitry configured to implement aspects of the present disclosure.

FIG. 17 is a functional block diagram illustrating processing circuitry 31 implemented according to different hardware units and software modules (e.g., as instructions 39 stored on memory circuitry 32 according to one aspect of the present disclosure). As seen in FIG. 17, processing circuitry 31 implements a meta data aggregator unit and/or module 31a. This unit and/or module 31a receives and accumulates the data received from the various sources external to the vehicle 20.

A physics engine unit and/or module 31b calculates the physics of various corrective actions of the vehicle 20 and movements of the vehicle 20 and/or objects 11, 12. This can further include other physic calculations including but not limited to mass calculations, momentum calculations, speed and rate calculations, acceleration/deceleration rates. This can also include calculations for determining the various travel paths of the vehicle 20 and/or objects 11, 12. The physics engine unit and/or module 31b uses the data stored in the memory circuitry 32 or otherwise obtained by the control unit 30.

A warning/alert unit and/or module 31c provides for alerting or otherwise notifying the operator of a vehicle 20 about various aspects, such as an impending collision and corrective actions. This can include displaying information to the operator on a display 29 and/or providing an audio message.

A vehicle control unit and/or module 31d operates the vehicle 20 based on various data. This can include but is not limited to operating the steering unit 23, braking unit 24, and engine 21.

An image recognition unit and/or module 31e provides for identifying objects 11, 12 and various other aspects encountered by the vehicle 20 in the environment 100. The image recognition unit and/or module 31e uses images recording by the one or more imaging devices 26 to identify the various aspects. Data from one or more sensors 25 and/or received by the control unit 30 can further be used in the identification.

In another example, the processing circuitry 31 includes an artificial intelligence module that has one or more machine learning engines. This module analyzes previous data and avoidance results and provides for improvements in one or more of preventing a collision and reducing a severity of a collision based on the available data.

In the methods and systems described above, the control unit 30 in the vehicle 20 functions to reduce the severity of a collision. In another example, this function is performed by the server 80. The server 80 monitors the environment 100 through data previous stored in memory circuitry 82 and data received from various sources, including one or more of the vehicle 20, objects 11, 12, remote sources 86, and environment 100. The server 80 identifies an impending collision based on the data and takes the corrective action. In one example, the environment 100 is a manufacturing facility and the server 80 is positioned on-site and receives input from the various sources and controls the movement within the manufacturing facility.

In another example, processing is shared between the vehicle 20 and server 80. One or both monitor the environment 100, determine an impending collision, and take corrective actions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of reducing a severity of a collision between a vehicle and an object that are both in an environment, the method comprising:
    determining expected locations of where each of the vehicle and the object will be located in the environment;
    identifying that a collision between the vehicle and the object is impending based on the expected locations;
    based on data from just the vehicle including a criticality map of both of the vehicle and the object, adjusting one or more operational controls of the vehicle and changing the expected location of the vehicle and reducing the severity of the collision with the criticality maps comprising for each of the vehicle and the object one or more higher critical zones and lower critical zones that are spaced apart in a non-overlapping arrangement with an expected severity of the collision greater when an impact point of the collision occurs in one of the higher critical zones than in one of the lower critical zones; and
    obtaining the criticality maps from a remote source and storing the criticality maps at the vehicle prior to identifying that the collision is impending.

2. The method of claim 1, further comprising changing a travel path of the vehicle and preventing the impact point of the collision from occurring at higher critical zones on the vehicle and the object.

3. The method of claim 1, further comprising determining a mass of the object and adjusting the one or more operational controls of the vehicle based on the mass of the object.

4. The method of claim 1, wherein adjusting the one or more operations controls of the vehicle and changing the expected location of the vehicle and reducing the severity of the collision comprises:
    determining a velocity of one or both of the vehicle and the object;
    determining a mass of one or both of the vehicle and the object; and
    determining a new travel path of the vehicle based on one or more of the velocity, the mass, and the criticality maps.

5. The method of claim 1, further comprising determining the location of a person in the object based on images of the object taken from a camera on the vehicle and determining a new travel path for the vehicle based on the location of the person.

6. The method of claim 1, wherein adjusting the one or more operational controls of the vehicle and changing the expected location of the vehicle and reducing the severity of the collision comprises autonomously controlling the vehicle based on one or more sensor readings taken at the vehicle.

7. The method of claim 1, wherein adjusting the one or more operational controls of the vehicle and changing the expected location of the vehicle and reducing the severity of the collision comprises changing a travel path of the vehicle and avoiding the object.

8. The method of claim 1, further comprising obtaining by the vehicle a mass of the vehicle, a mass of the object, the criticality map of the vehicle, and the criticality map of the object prior to identifying that the collision between the vehicle and the object is impending.

9. A method of reducing a severity of a collision between a vehicle and an object that are both in an environment, the method comprising:
    determining a travel path of the vehicle in the environment;
    determining an expected location of the object in the environment;
    identifying that a collision between the vehicle and the object is impending based on the travel path and the expected location;
    based on criticality maps of the vehicle and the object that are obtained from a remote source and stored at the vehicle prior to identifying the impending collision and without input from the object, determining a new travel path for the vehicle in the environment and preventing a high criticality zone on at least one of the vehicle or the object from being impacted in the collision; and
    wherein the criticality maps comprise two or more different zones that indicate a severity of a collision if an impact location occurred within the zone.

10. The method of claim 9, further comprising determining the new travel path based on a velocity of one or both of the vehicle and the object and a mass of one or both of the vehicle and the object.

11. The method of claim 9, further comprising:
    capturing images of the object;
    determining a location of a person in the object based on the images; and
    determining the new travel path based on the location of the person in the object.

12. A computing device configured to reduce a severity of a collision between a vehicle and an object that are both in an environment, the computing device comprising:
    communications circuitry configured to communicate; and
    processing circuitry configured to:
        determine expected locations of each of the vehicle and the object in the environment at a future time;
        determine that a collision between the vehicle and the object is impending based on the expected locations; and
        in response to determining the impending collision, change a travel path of the vehicle and reduce a severity of the collision; and
    memory circuitry at the vehicle that stores criticality maps of both of the vehicle and the object with the processing circuitry configured to change the travel path based on the one or both criticality maps, the criticality maps being stored in the memory circuitry prior to determining the impending collision.

13. The computing device of claim 12, wherein the computing device is located in the vehicle.

14. The computing device of claim 12, wherein the computing device comprises a camera to capture one or more images of the object, and the processing circuitry is configured to identify the object based on the one or more images.

15. The computing device of claim 12, wherein the processing circuitry is configured to retrieve a mass of the object and the vehicle and to change the travel path based on the masses.

16. The computing device of claim 12, wherein the processing circuitry is configured to adjust steering and braking of the vehicle to change the travel path.

17. The computing device of claim 12, wherein the processing circuitry is configured to control the vehicle autonomously.

18. The computing device of claim 12, wherein the criticality maps are obtained from a remote server that monitors the movement of the object and the location of the object within the environment.

19. The method of claim 9, wherein obtaining the criticality maps from the remote source comprises obtaining the criticality maps from a server located remotely from both of the vehicle and the object.

20. The method of claim 9, further comprising obtaining a mass of the object through communications with the object.

* * * * *